No. 779,656.

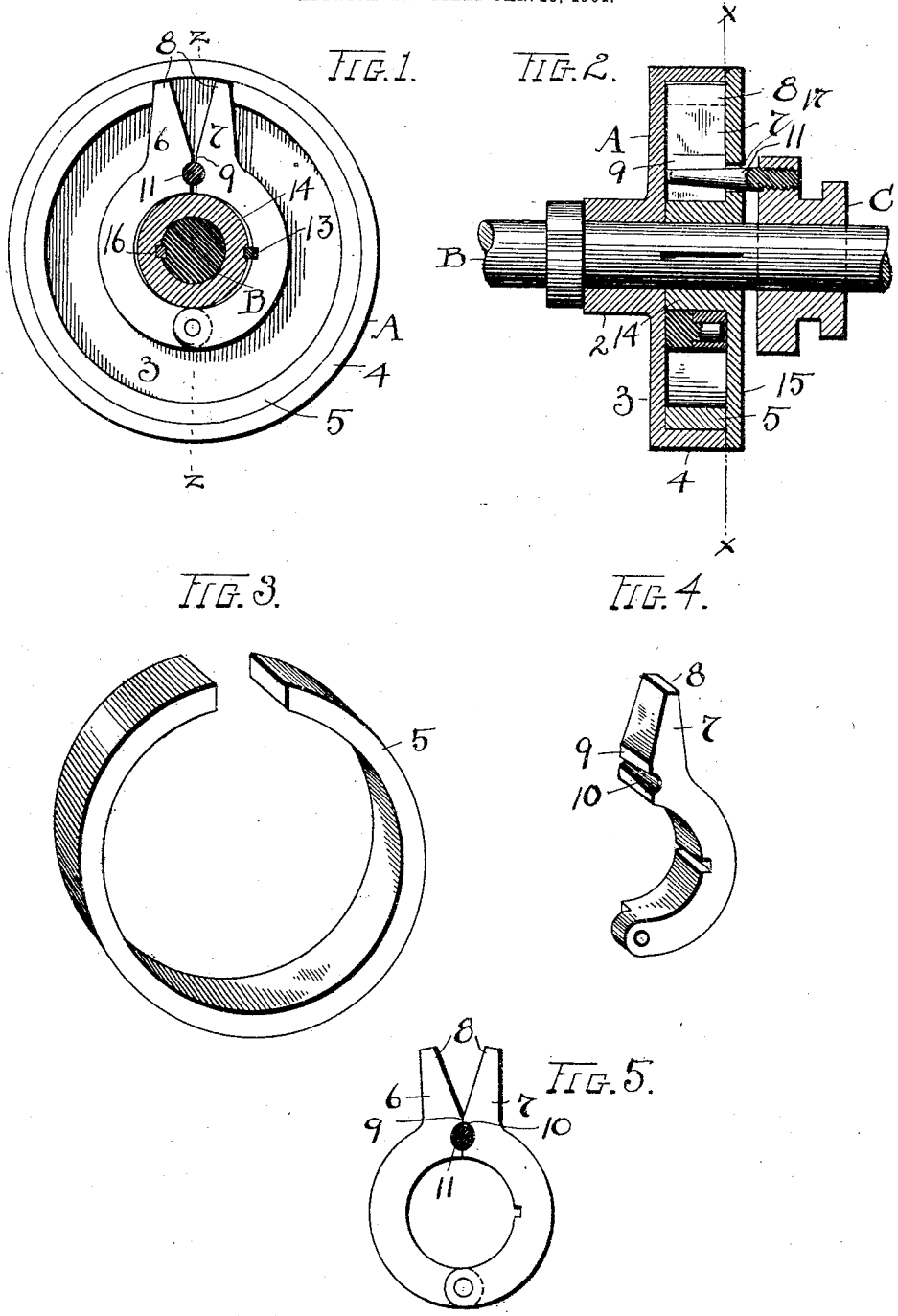

Patented January 10, 1905.

UNITED STATES PATENT OFFICE.

FRANK KIRK, OF JEANNETTE, PENNSYLVANIA, ASSIGNOR OF ONE-SIXTH TO ERNEST A. DAISHER, OF TECUMSEH, MICHIGAN.

FRICTION CLUTCH AND BRAKE.

SPECIFICATION forming part of Letters Patent No. 779,656, dated January 10, 1905.

Application filed January 18, 1904. Serial No. 189,431.

*To all whom it may concern:*

Be it known that I, FRANK KIRK, a citizen of the United States, residing at Jeannette, in the county of Westmoreland and State of Pennsylvania, have invented certain new and useful Improvements in Friction Clutches and Brakes; and I do declare that the following is a full, clear, and exact description of the invention, which will enable others skilled in the art to which it appertains to make and use the same.

My invention relates to improvements in friction-clutches; and the improvement consists in the construction of a clutch, all as hereinafter shown and described, and more particularly pointed out in the claim.

The object of my improvement is to provide a simple clutch mechanism of the fewest number of parts, all operating to the highest degree of effectiveness, with adequate provision for take-up in wear.

In the accompanying drawings, Figure 1 is a side view and sectional elevation of my improved clutch on line X X, Fig. 2. Fig. 2 is a central sectional view on line Z Z, Fig. 1. Fig. 3 is a perspective view of the friction band or split ring. Fig. 4 is a perspective view of one of the spreading arms. Fig. 5 is a side elevation of the spreading arms brought together and showing the lesser diameter of the round tapered pin within the oval-shaped hole formed by the tapering grooves in the arms.

A represents a shell or casing which is adapted to be used as a band-pulley, but which, as is obvious, may be substituted by a sprocket or gearing. Shell or casing A comprises a hub 2, freely mounted to revolve on shaft B and having a wall 3, provided with an annular rim or flange 4. A friction spring band or split ring 5 is confined within shell A and has a neat slip fit or engagement with the inner side of flange 4 and is adapted to turn idly within shell A when said shell is held stationary; but when rotation of said shell is desired frictional engagement between flange 4 and ring 5 is had and maintained by means of a pair of spreading arms 6 and 7, which are each curved to encircle shaft B and provided with an extension 8, bearing against opposite ends of split ring 5. The spring of ring 5 normally throws and holds extensions 8 inward toward each other and into abutting relation, as shown in Fig. 5.

The lower ends of arms 6 and 7 are pivotally connected and the abutting portions or faces 9 have each a rounded and tapering groove 10 therein, which when oppositely disposed and brought together give an oval-shaped hole or opening. A tapered pin 11, round in cross-section, makes engagement at each side with grooves 10, and when carried inward by shipper-ring C, upon which said pin is removably secured, arms 6 and 7 are spread or forced apart and ring 5 expanded by extensions 8. This effectively locks ring 5 and shell A together, and as arm 7 is keyed or splined at 13 to the hub 14 of retaining and drive plate 15, which in turn is keyed or splined at 16 to shaft B, all said parts are caused to rotate by the rotation of shaft B. Plate 15 has an opening 17, through which pin 11 projects upon entering grooves 10. Pin 11 is preferably fastened upon shipper-ring C to permit removal therefrom and whereby a new pin can readily be substituted when the old one becomes worn. As shown, pin 11 is threaded or screwed into the face of shipper-ring; but it may be bolted or otherwise removably attached thereto.

In operation the clutch members are brought to frictional or engaging relationship by sliding shipper-ring C to the left and driving pin 11 inward to spread arms 6 and 7, and when the reverse movement of shipper-ring C is brought about and pin 11 moved outward ring 5 springs back and of its own accord frees itself from flange 4, but keeps the other parts in working relations.

All wear sustained by flange 4 and ring 5 or arms 6 and 7 can all be taken up by changing the pin 11 if it be deemed necessary. Ordinarily the taper of the pin takes up the wear until parts 4 and 5 are practically worn out.

What I claim is—

In a friction-clutch, a shaft and a shell free to revolve thereon, a spring split friction-ring fitted within said shell and normally contracted out of engagement with said shell, a retaining hubbed drive-plate keyed to said shaft at one side of said shell, a set of arms pivotally connected at one end and engaged with the ends of said split ring at their other end and one of said arms splined centrally between its ends upon said hubbed drive-plate, an abutting face for each arm and a circular tapering groove in each face providing an oval opening where said arms abut, and a shipper-ring adapted to slide on said shaft and provided with a round tapered pin adapted to project into said opening and forcibly separate said arms, substantially as described.

In testimony whereof I sign this specification in the presence of two witnesses.

FRANK KIRK.

Witnesses:
R. B. MOSER,
C. A. SELL.